US00RE42613E

(19) United States
(12) Reissued Patent
Graham

(10) Patent Number: US RE42,613 E
(45) Date of Reissued Patent: Aug. 16, 2011

(54) RECHARGEABLE UNIVERSAL REMOTE CONTROL ASSEMBLY

(76) Inventor: Tarah N. Graham, Atlanta, GA (US)

(21) Appl. No.: 11/786,801

(22) Filed: Apr. 11, 2007

Related U.S. Patent Documents

Reissue of:
(64) Patent No.: 6,879,254
Issued: Jan. 12, 2005
Appl. No.: 10/295,627
Filed: Nov. 15, 2002

(51) Int. Cl.
*G08B 1/08* (2006.01)

(52) U.S. Cl. ..... 340/539.32; 340/539.13; 340/825.49; 340/568.1; 340/815.42; 340/815.43; 341/20; 341/22; 341/176; 456/575.1; 456/567; 398/106

(58) Field of Classification Search ..... 340/539.32, 340/539.13, 825.49, 568.1, 815.42, 815.43, 340/815.4; 455/575.1, 567; 398/106, 103; 341/20, 22, 176
See application file for complete search history.

(56) References Cited

U.S. PATENT DOCUMENTS

| | | | | |
|---|---|---|---|---|
| 3,582,783 | A | 6/1971 | Hendrickson | 325/37 |
| 4,718,112 | A | 1/1988 | Shinoda | 455/151 |
| 5,412,377 | A | 5/1995 | Evans et al. | 340/825.22 |
| 5,790,021 | A * | 8/1998 | Mickel et al. | 340/539.32 |
| 5,952,918 | A * | 9/1999 | Ohayon | 340/539.32 |
| 5,953,144 | A | 9/1999 | Darbee et al. | 359/48 |
| 6,147,602 | A * | 11/2000 | Bender | 340/568.1 |
| D435,544 | S | 12/2000 | Gioscia | D14/218 |
| 6,308,074 | B1 * | 10/2001 | Chandra et al. | 455/462 |
| 6,360,399 | B1 * | 3/2002 | Vandenbelt et al. | 15/324 |
| 6,366,202 | B1 * | 4/2002 | Rosenthal | 340/539.32 |
| 6,445,290 | B1 * | 9/2002 | Fingal et al. | 340/539.32 |
| 6,489,746 | B1 * | 12/2002 | Pettinato | 320/111 |
| 6,535,125 | B2 * | 3/2003 | Trivett | 340/539.13 |

* cited by examiner

*Primary Examiner* — Phung Nguyen
(74) *Attorney, Agent, or Firm* — The Starr Law Firm, LLC

(57) ABSTRACT

A rechargeable universal remote control assembly for providing a multi-function multipurpose remote control with a base charger, remote control finder, and other functional features includes a remote control and a base unit. The remote control is recharged using the base unit. The base unit also includes a button operationally coupled to a transmitter for sending a locate signal to the remote control. The remote control includes a receiver for receiving the locate signal. In response to the locate signal, the remote control provides audio and visual signals to assist a user in finding the remote control unit. The remote control has capability to operate multiple devices including TVs, VCRs, satellite receivers, audio and visual receivers, stereo equipment, and the like.

21 Claims, 5 Drawing Sheets

REMOTE CONTROL

CHARGER BASE

RECHARGEABLE UNIVERSAL REMOTE CONTROL ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to universal remote controls and more particularly pertains to a new rechargeable universal remote control assembly for providing a multifunction multipurpose remote control with a base charger, remote control finder, and other functional features.

2. Description of the Prior Art

The use of universal remote controls is known in the prior art. U.S. Pat. No. 4,718,112 describes a remote control apparatus for programming a series of control commands for use at a later time. Another type of universal remote controls is U.S. Pat. No. 5,953,144 having a ROM-less microprocessor system. U.S. Pat. No. 5,790,021 discloses a remote control having a base unit and a remote control finder. U.S. Pat. No. 3,582,783 discloses a multiple function remote control unit. U.S. Pat. No. 5,412,377 also discloses a remote control unit that has a scheduling function. U.S. Patent No. Des. 435,544 shows an ornamental design for a universal remote control.

While these devices fulfill their respective, particular objectives and requirements, the need remains for a remote control system that will provide commands for multiple and various devices in combination with a base unit for recharging the remote control, a remote control finding function, and wherein the remote control has a light for outlining the housing of the remote control.

SUMMARY OF THE INVENTION

The present invention meets the needs presented above by generally comprising a remote control and a base unit. The remote control is recharged using the base unit. The base unit also includes a button operationally coupled to a transmitter for sending a locate signal to the remote control. The remote control includes a receiver for receiving the locate signal. In response to the locate signal, the remote control provides audio and visual signals to assist a user in finding the remote control unit. The remote control has capability to operate multiple devices including TVs, VCRs, satellite receivers, audio and visual receivers, stereo equipment, and the like.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
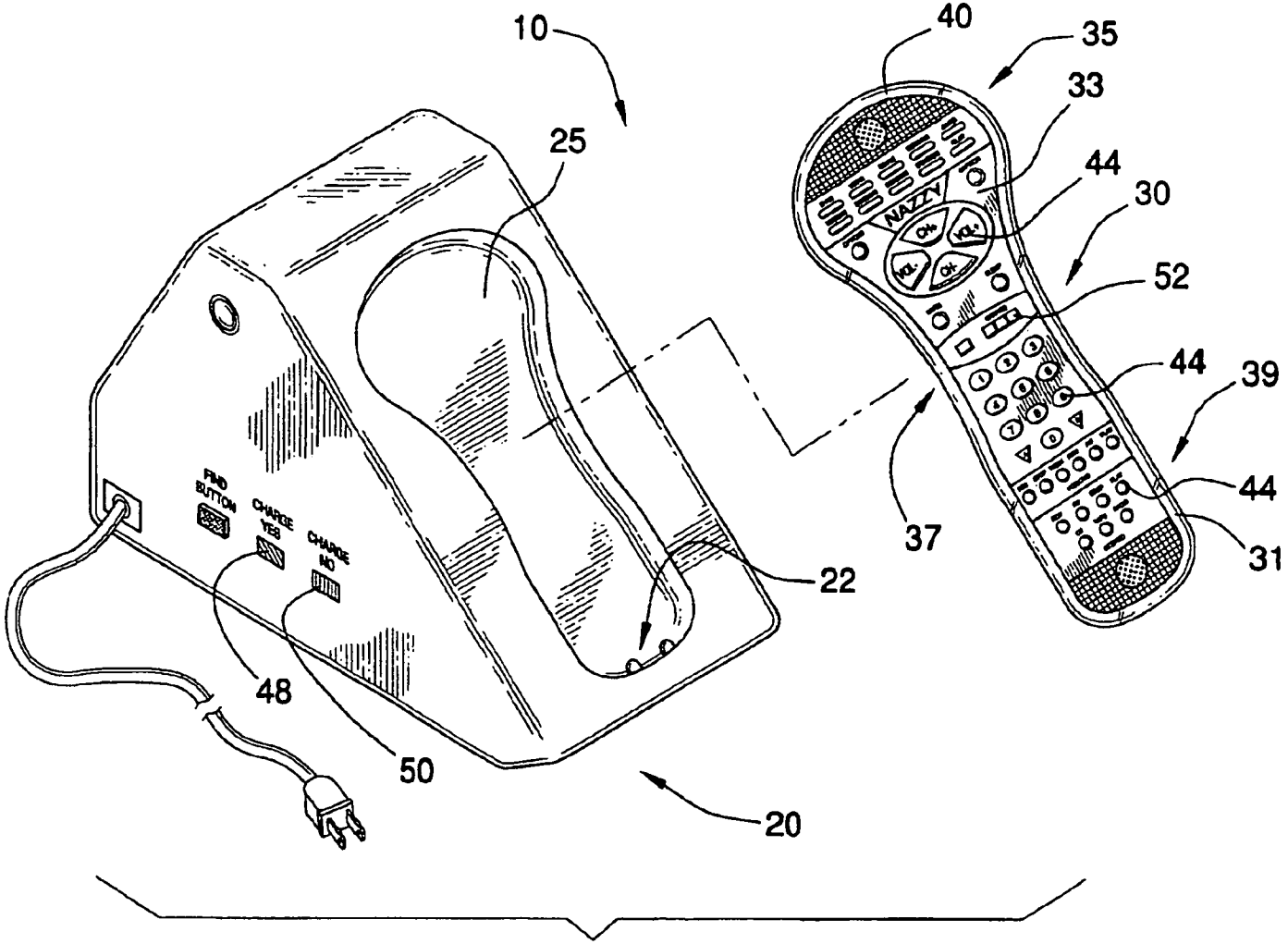
FIG. 1 is a perspective view of a new rechargeable universal remote control assembly according to the present invention.
Figure 2:
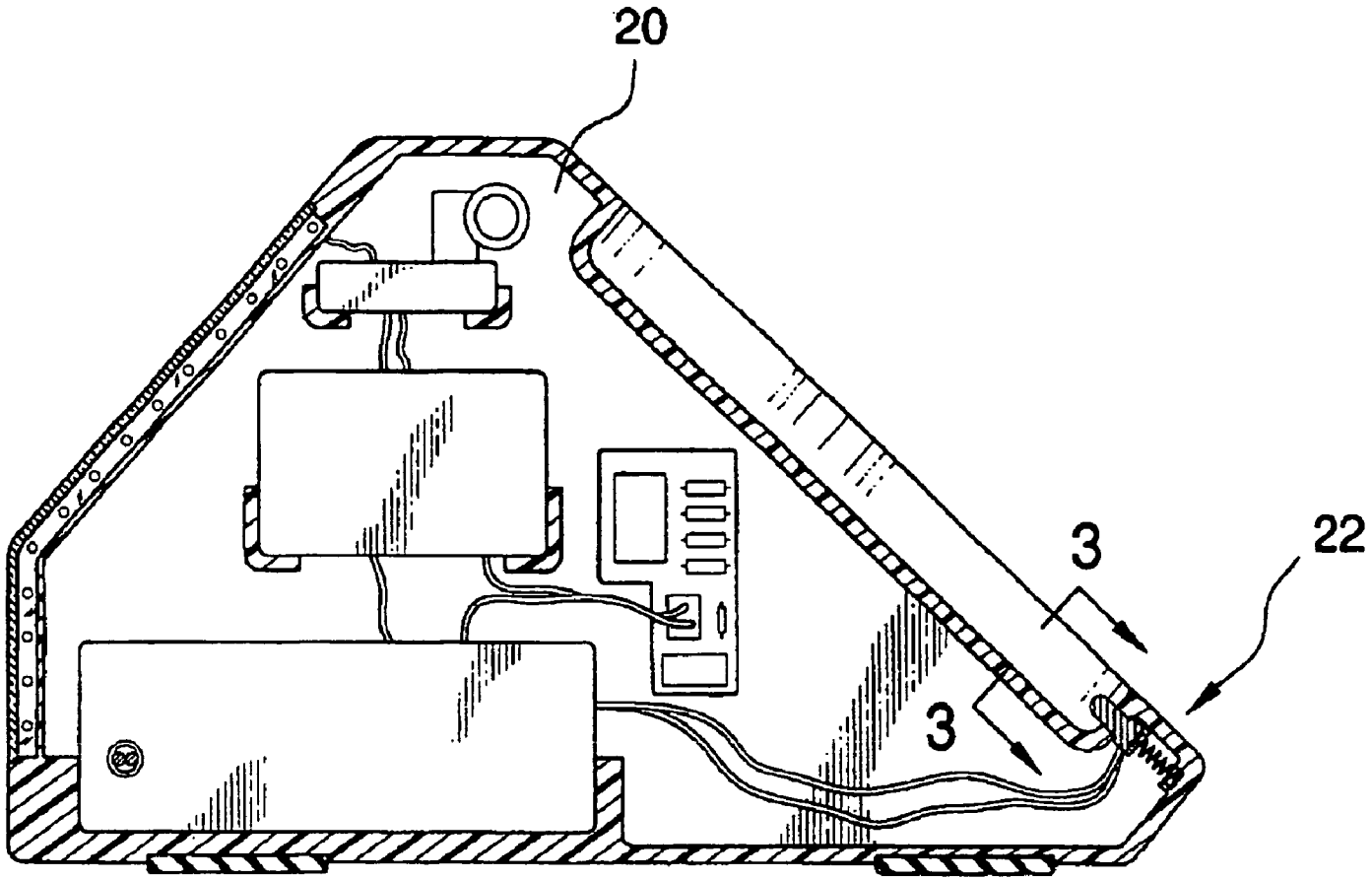
FIG. 2 is a cross-sectional view of the base unit of the present invention.
Figure 3:
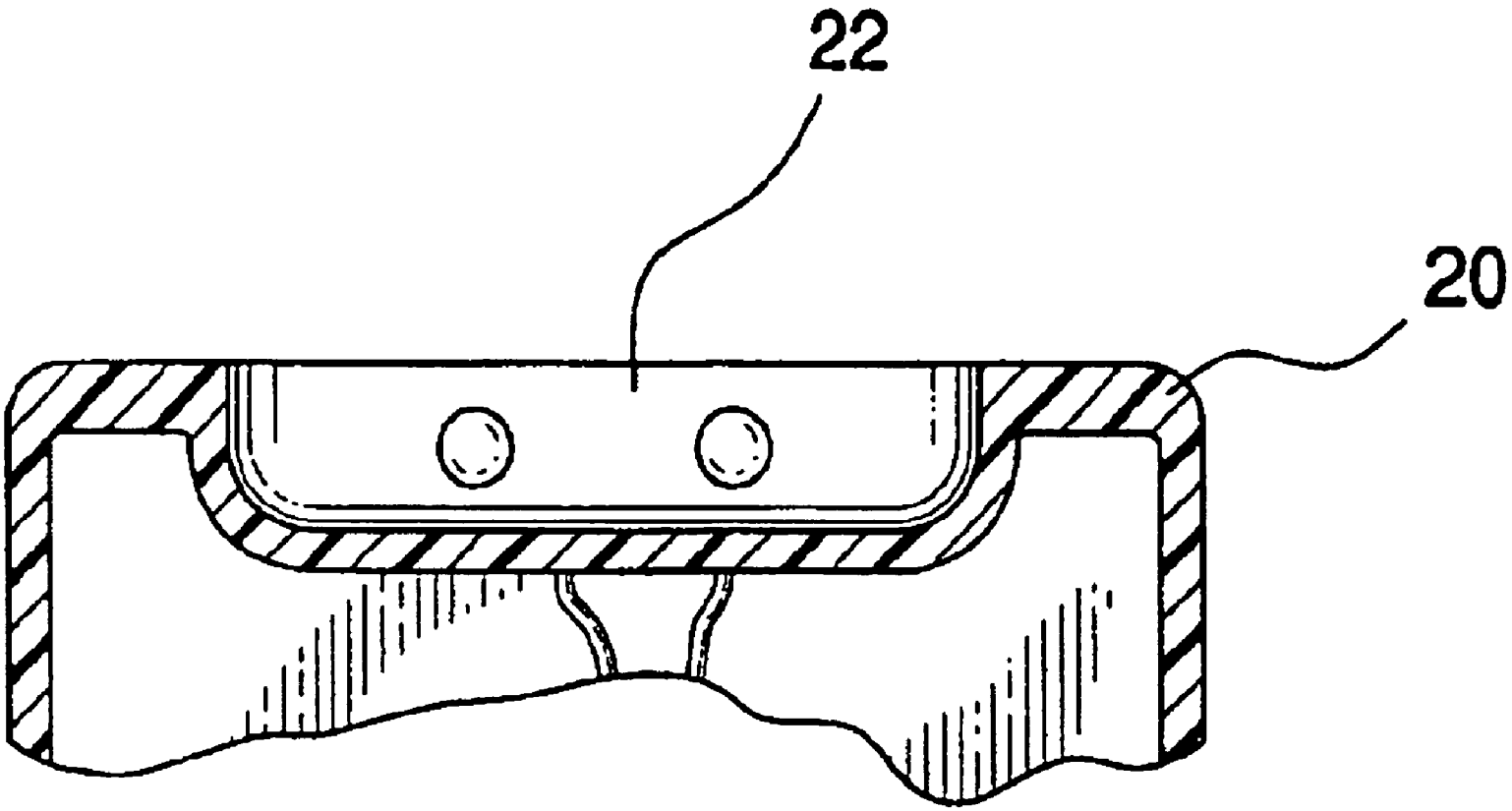
FIG. 3 is a cross-sectional view of the base unit of the present invention taken along line 3-3 in FIG. 2.
Figure 4:
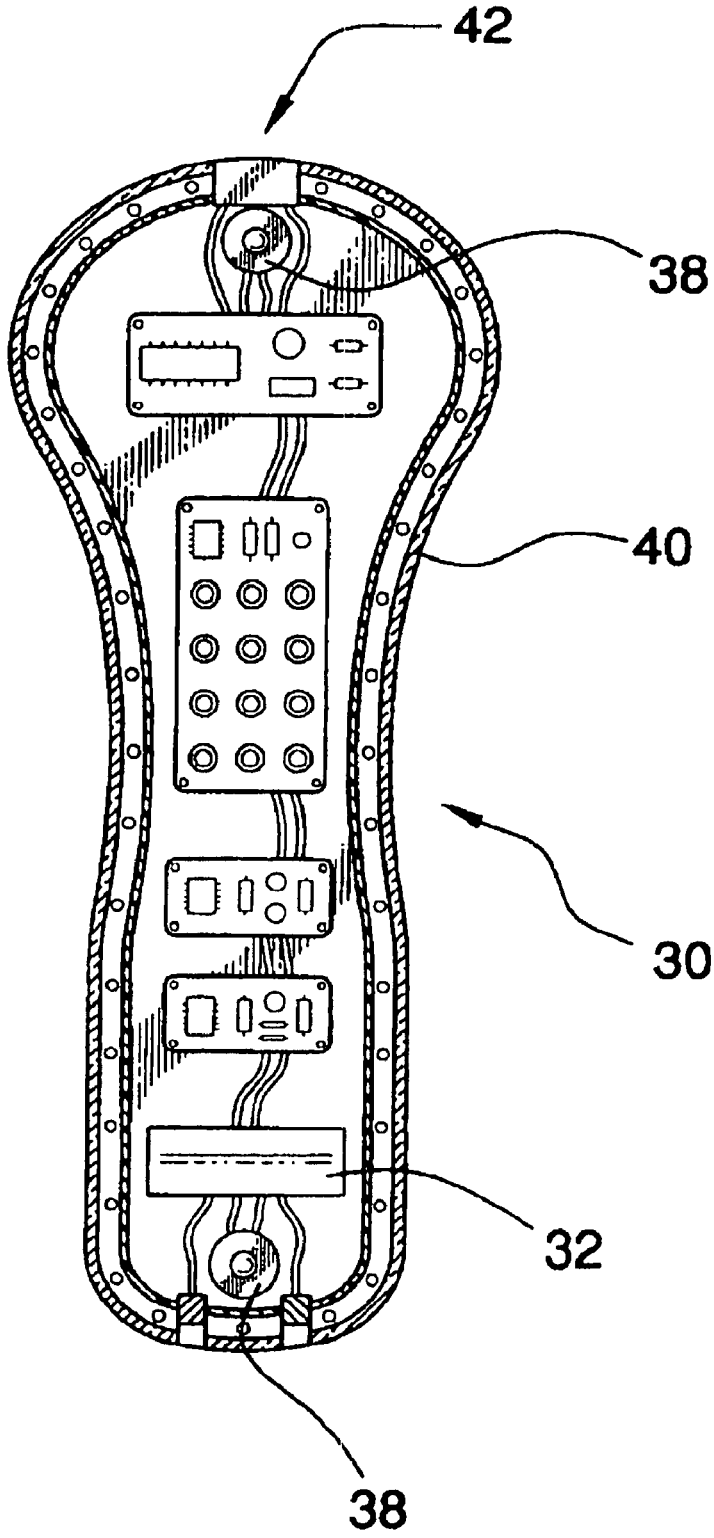
FIG. 4 is a cross-sectional view of the remote unit of the present invention.
Figure 6:
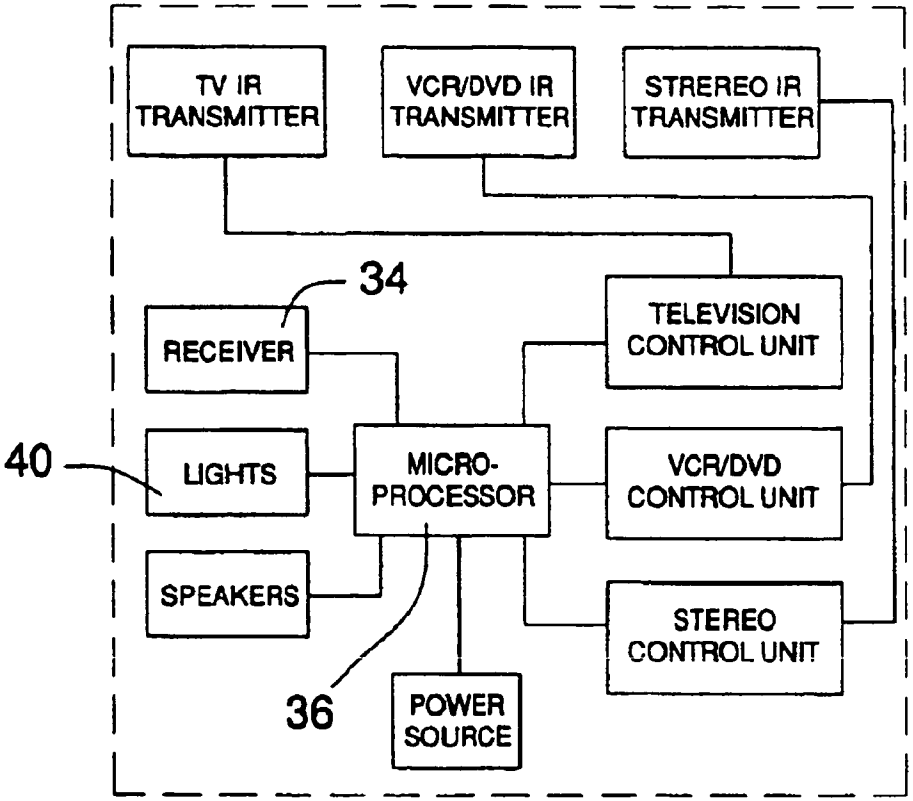
FIG. 6 is a schematic diagram view of the remote unit of the present invention.
Figure 5:
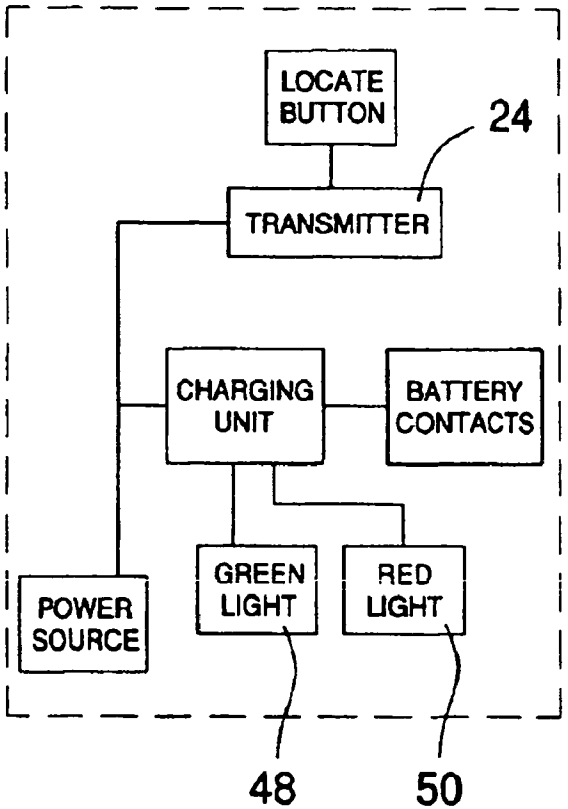
FIG. 5 is a schematic diagram view of the base unit of the present invention.

With reference now to the drawings, and in particular to FIGS. 1 through 6 thereof, a new rechargeable universal remote control assembly embodying the principles and concepts of the present invention and generally designated by the reference numeral 10 will be described.

As best illustrated in FIGS. 1 through 6, the rechargeable universal remote control assembly 10 generally comprises a base unit 20 having a charging port 22 and a remote control unit 30 having a battery 32. The remote control unit 30 is positionable on the base unit 20 such that the remote control unit 30 operationally engages the charging port 22. Thus, the base unit 20 charges the battery 32 of the remote control unit 30.

A transmitter 24 is positioned in the base unit 20 for transmitting a locate signal. A receiver 34 is positioned in the remote control unit 30 for receiving the locate signal from the transmitter 24.

A microprocessor 36 is positioned in the remote control unit 30. The receiver 34 is operationally coupled to the microprocessor 36. A speaker 38 is operationally coupled to the microprocessor 36 for producing an audio signal from the remote control unit 30 when the receiver 34 receives the locate signal from the transmitter 24.

A light source 40 is operationally coupled to the microprocessor 36 for illuminating when the receiver 34 receives the locate signal from the transmitter 24. The light source 40 is a tubular light extending around a perimeter 31 of the remote control unit 30.

An infrared transmitter 42 is operationally coupled to the microprocessor 36 for sending operational commands from the remote control unit 30 based on use of a plurality of operational keys 44. Each of the operational keys 44 is operationally coupled to the microprocessor 36 for sending a selectable operational command from the remote control unit 30 using the operational keys 44. The operational keys are configured into groups for controlling particular devices including TV, VCR, DVD, stereo and video receivers, satellite receivers, and audio equipment. The remote control unit may further include operational keys and programs to operate other household devices such as ceiling fans or appliances remotely using the remote control unit 30.

A plurality of indicator lights 46 are positioned on the base unit 20. One of the indicator lights is a positive charging light 48. The positive charging light 48 illuminates when the remote control unit 30 engages the charging port 22 of the base unit 20 to successfully charge the battery 32 of the remote control unit 30. A second one of the indicator lights is a negative charging light 50. The negative charging light 50 illuminates when the remote control unit 30 is disengaged from the charging port 22 of the base unit 20.

The remote control unit 30 has a plurality of battery charge indicators 52 operationally coupled to the battery 32 for indicating a charge level of the battery 32. In an embodiment, the battery charge indicators 52 are aligned next to each other and illuminate in sequence such that a number of illuminated battery charge indicators indicates a degree to which the battery 32 is charged.

The remote control unit 30 has a housing 33 having a bulbous forward portion 35, a neck portion 37, and a rear portion 39. The base unit 20 has a depression 25 for receiving the remote control unit 30. The depression 25 has a complementary shape to the remote control unit 30 to prevent movement of the remote control unit 30 within the depression 25.

In use, the remote control unit is placed into the depression of the base unit to charge the remote control unit. The remote control unit is used in similar fashion to existing remote controls to operate a variety of devices. When removed from the base unit, the remote control unit can be located easily by pressing a button on the base unit. In response to the button on the base unit being pressed, the remote control unit provides an audio signal via a speaker and a visual signal via the light source extending around the perimeter of the remote control unit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to he encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A universal remote control and remote control finding system comprising:

a base unit having a charging port;

a remote control unit having a battery, said remote control unit being positionable on said base unit such that said remote control unit operationally engages said charging port whereby said base unit charges said battery of said remote control unit;

a transmitter positioned in said base unit for transmitting a locate signal;

a receiver positioned in said remote control unit for receiving said locate signal from said transmitter;

a microprocessor positioned in said remote control unit, said receiver being operationally coupled to said microprocessor;

a speaker operationally coupled to said microprocessor for producing an audio signal from said remote control unit when said receiver receives said locate signal from said transmitter;

a light source operationally coupled to said microprocessor for illuminating when said receiver [receivers] *receives* said locate signal from said transmitter; and wherein said light source is a tubular light extending around a perimeter of said remote control unit to illuminate an area around said remote control unit.

2. The universal remote control and remote control finding system of claim 1, further comprising:

an infrared transmitter operationally coupled to said microprocessor for sending operational commands from said remote control.

3. The universal remote control and remote control finding system of claim 1, further comprising:

a plurality of indicator lights on said base unit, one of said plurality of indicator lights being a positive charging light, said charging light illuminating when said remote control unit engages said charging port of said base unit to successfully charge said battery of said remote control unit.

4. The universal remote control and remote control finding system of claim 3 wherein a second one of said plurality of indicator lights is a negative charging light, said negative charging light illuminating when said remote control unit is disengaged from said charging port of said base unit.

5. The universal remote control and remote control finding system of claim 1, further comprising:

said remote control unit including a plurality of operational keys, each of said operational keys being operationally coupled to said microprocessor for sending a selectable operational command from said remote control using said operational keys.

6. The universal remote control and remote control finding system of claim 1, further comprising:

said remote control unit having a plurality of battery charge indicators operationally coupled to said battery for indicating a charge level of said battery.

7. The universal remote control and remote control finding system of claim 6, further comprising:

said plurality of battery charge indicators being aligned next to each other and illuminating in sequence such that a number of illuminated battery charge indicators indicates a degree to which said battery is charged.

8. The universal remote control and remote control finding system of claim 1, further comprising:

said remote control unit having a housing, said housing having a bulbous forward portion, a neck portion, and a rear portion; and said base unit having a depression for receiving said remote control unit, said depression having a complementary shape to said remote control unit to prevent movement of said remote control unit within said depression and to insure proper alignment of said remote control unit in said depression of said base unit for proper charging of said battery of said remote control unit.

9. A universal remote control and remote control finding system comprising:

a base unit having a charging port;

a remote control unit having a battery, said remote control unit being positionable on said base unit such that said remote control unit operationally engages said charging port whereby said base unit charges said battery of said remote control unit;

a transmitter positioned in said base unit for transmitting a locate signal;

a receiver positioned in said remote control unit for receiving said locate signal from said transmitter;

a microprocessor positioned in said remote control unit, said receiver being operationally coupled to said microprocessor;

a speaker operationally coupled to said microprocessor for producing an audio signal from said remote control unit when said receiver receives said locate signal from said transmitter;

a light source operationally coupled to said microprocessor for illuminating when said receiver [receivers] *receives* said locate signal from said transmitter;

wherein said light source is a tubular light extending around a perimeter of said remote control unit;

an infrared transmitter operationally coupled to said microprocessor for sending operational commands from said remote control;

a plurality of indicator lights on said base unit, one of said plurality of indicator lights being a positive charging light, said charging light illuminating when said remote control unit engages said charging port of said base unit to successfully charge said battery of said remote control unit;

wherein a second one of said plurality of indicator lights is a negative charging light, said negative charging light illuminating when said remote control unit is disengaged from said charging port of said base unit;

said remote control unit including a plurality of operational keys, each of said operational keys being operationally coupled to said microprocessor for sending a selectable operational command from said remote control using said operational keys;

said remote control unit having a plurality of battery charge indicators operationally coupled to said battery for indicating a charge level of said battery;

said plurality of battery charge indicators being aligned next to each other and illuminating in sequence such to that a number of illuminated battery charge indicators indicates a degree to which said battery is charged;

said remote control unit having a housing, said housing having a bulbous forward portion, a neck portion, and a rear portion; and said base unit having a depression for receiving said remote control unit, said depression having a complementary shape to said remote control unit to prevent of said remote control unit within said depression.

*10. A rechargeable remote control and remote control finding system comprising:*

*a base unit having a charging port;*

*a remote control unit having a battery, the remote control unit being positionable on the base unit such that the remote control unit operationally engages the charging port whereby the base unit charges the battery of the remote control unit; a transmitter positioned in the base unit for transmitting a locate signal; a receiver positioned in the remote control unit for receiving the locate signal from the transmitter; and*

*a light source positioned in the remote control unit for producing a findable visual signal to assist a user in finding the remote control unit when the receiver receives the locate signal from the transmitter, the light source being distributed over the remote control unit so as to make the visual signal less likely to be obscured.*

*11. The rechargeable remote control and remote control finding system of claim 10, further comprising a speaker for producing a findable audio signal to assist a user in finding the remote control unit when the receiver receives the locate signal from the transmitter.*

*12. The rechargeable remote control and remote control finding system of claim 10, wherein the light source extends around at least a portion of a perimeter of the remote control unit.*

*13. The rechargeable remote control and remote control finding system of claim 10 wherein the light source is a tubular light.*

*14. The rechargeable remote control and remote control finding system of claim 10, wherein the remote control unit is a universal remote control.*

*15. The rechargeable remote control and remote control finding system of claim 10, wherein a microprocessor is positioned in the remote control unit and the receiver is operationally coupled to the microprocessor.*

*16. The rechargeable remote control and remote control finding system of claim 15, wherein an infrared transmitter is positioned in the remote control and is operationally coupled to the microprocessor for sending operational commands from the remote control.*

*17. The rechargeable remote control and remote control finding system of claim 10, wherein the base unit includes at least one charging indicator light for indicating the charging status of the unit.*

*18. The rechargeable remote control and remote control finding system of claim 17, wherein the at least one charging indicator light included in the base unit is a positive charging light, the positive charging light illuminating when the remote control unit engages the charging port of the base unit to successfully charge the battery of the remote control unit.*

*19. The rechargeable remote control and remote control finding system of claim 17, wherein the at least one charging indicator light included in the base, unit is a negative charging light, the negative charging light illuminating when the remote control unit is disengaged from the charging port of the base unit.*

*20. The rechargeable remote control and remote control finding system of claim 10, wherein the remote control includes at least one battery charge indicator that is operationally coupled to the battery for indicating them charge level of the battery.*

*21. The rechargeable remote control and remote control finding system of claim 10, wherein the light source is distributed over the remote control unit so as to be substantially situated at least at two corners of the remote control unit.*

* * * * *

UNITED STATES PATENT AND TRADEMARK OFFICE

CERTIFICATE OF CORRECTION

PATENT NO. : RE42,613 E
APPLICATION NO. : 11/786801
DATED : August 16, 2011
INVENTOR(S) : Tarah N. Graham It is certified that error appears in the above-identified patent and that said Letters Patent is hereby corrected as shown below:

Title Page, item [64] under Reissue, should be changed from January 12, 2005 to April 12, 2005.

Signed and Sealed this
Third Day of September, 2013

Teresa Stanek Rea
*Acting Director of the United States Patent and Trademark Office*